United States Patent
Parsons

(10) Patent No.: US 10,598,940 B2
(45) Date of Patent: Mar. 24, 2020

(54) SINGLE CHIP SUPERLUMINOUS LIGHT EMITTING DIODE ARRAY FOR WAVEGUIDE DISPLAYS WITH PARTICULAR COHERENCE LENGTH AND DIVERGENCE ANGLE

(71) Applicant: Facebook Technologies, LLC, Menlo Park, CA (US)

(72) Inventor: Maxwell Parsons, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/385,134

(22) Filed: Apr. 16, 2019

(65) Prior Publication Data
US 2019/0285898 A1 Sep. 19, 2019

Related U.S. Application Data

(63) Continuation of application No. 16/201,621, filed on Nov. 27, 2018, now Pat. No. 10,310,272, which is a (Continued)

(51) Int. Cl.
*G02B 27/01* (2006.01)
*G02B 26/10* (2006.01)
(Continued)

(52) U.S. Cl.
CPC ..... *G02B 27/0172* (2013.01); *G02B 26/0833* (2013.01); *G02B 26/101* (2013.01);
(Continued)

(58) Field of Classification Search
CPC .............. G02B 27/0172; G02B 27/145; G02B 27/0922; G02B 27/141; G02B 26/101;
(Continued)

(56) References Cited

U.S. PATENT DOCUMENTS 9,097,511 B2 8/2015 Kuroda
9,338,570 B2 * 5/2016 Holzmann ........... H04R 29/004
(Continued)

FOREIGN PATENT DOCUMENTS

| EP | 3053513 A1 | 8/2016 |
| JP | 2016-109923 A | 6/2016 |
| TW | 201624754 A | 7/2016 |

OTHER PUBLICATIONS

PCT International Search Report and Written Opinion, PCT Application No. PCT/US2019/017672, Jul. 25, 2019, 10 pages.
(Continued)

*Primary Examiner* — Andrew Jordan
(74) *Attorney, Agent, or Firm* — Fenwick & West LLP

(57) ABSTRACT

A source assembly for providing light. The source assembly comprises a source element array, and a scanning mirror assembly. The source element array includes a super luminous diode (SLED) array of SLEDs that are configured to emit light. The SLED array is on a single chip. Each SLED in the SLED array may emit light in the same color channel (e.g., green). There may be multiple SLED arrays that each are on respective chips and each are associated with a different color channel (e.g., one is red, one is blue, and one is green). The scanning mirror assembly is configured to scan light emitted from the SLED array (and/or multiple SLED arrays) to an entrance location of an output waveguide (e.g., of a waveguide display) as scanned image light.

20 Claims, 8 Drawing Sheets

Related U.S. Application Data continuation of application No. 15/996,427, filed on Jun. 1, 2018, now Pat. No. 10,168,537.

(60) Provisional application No. 62/644,353, filed on Mar. 16, 2018.

(51) Int. Cl.

| | |
|---|---|
| *G02B 26/08* | (2006.01) |
| *G02B 27/09* | (2006.01) |
| *G02B 27/14* | (2006.01) |
| *G09G 3/02* | (2006.01) |
| *G09G 3/34* | (2006.01) |
| *G09G 3/00* | (2006.01) |

(52) U.S. Cl.
CPC ....... *G02B 26/103* (2013.01); *G02B 27/0922* (2013.01); *G02B 27/141* (2013.01); *G02B 27/145* (2013.01); *G09G 3/001* (2013.01); *G09G 3/025* (2013.01); *G09G 3/346* (2013.01); *G09G 3/3413* (2013.01); *G02B 2027/0114* (2013.01); *G02B 2027/0178* (2013.01)

(58) Field of Classification Search
CPC .............. G02B 26/103; G02B 26/0833; G02B 2027/0178; G02B 2027/0114; G09G 3/3413; G09G 3/346; G09G 3/025
See application file for complete search history.

(56) References Cited

U.S. PATENT DOCUMENTS

| | | | |
|---|---|---|---|
| 9,690,178 B2 * | 6/2017 | Nishioka | H01L 33/0045 |
| 9,974,498 B2 | 5/2018 | Humphrey | |
| 10,056,020 B2 | 8/2018 | Chi et al. | |
| 10,168,537 B1 | 1/2019 | Parsons | |
| 2005/0228463 A1 | 10/2005 | Mac et al. | |
| 2014/0099054 A1 | 4/2014 | Black et al. | |
| 2014/0240714 A1 | 8/2014 | Matsuu et al. | |
| 2015/0098549 A1 | 4/2015 | Humphrey | |
| 2015/0098579 A1 | 4/2015 | Holzmann | |
| 2016/0190385 A1 * | 6/2016 | Nishioka | H01L 33/0045 353/85 |
| 2017/0235143 A1 | 8/2017 | Chi et al. | |
| 2017/0236463 A1 | 8/2017 | Chi et al. | |
| 2018/0052325 A1 | 2/2018 | Bohn | |
| 2018/0120559 A1 | 5/2018 | Yeoh et al. | |
| 2018/0130391 A1 | 5/2018 | Bohn | |
| 2018/0172995 A1 | 6/2018 | Lee et al. | |
| 2018/0284884 A1 | 10/2018 | Sulai et al. | |
| 2019/0004325 A1 | 1/2019 | Connor | |
| 2019/0285898 A1 * | 9/2019 | Parsons | G02B 26/103 |

OTHER PUBLICATIONS

Taiwan Intellectual Property Office, Office Action, Taiwan Application No. 108108496, Oct. 8, 2019, 13 pages.

* cited by examiner

SINGLE CHIP SUPERLUMINOUS LIGHT EMITTING DIODE ARRAY FOR WAVEGUIDE DISPLAYS WITH PARTICULAR COHERENCE LENGTH AND DIVERGENCE ANGLE

CROSS REFERENCE TO RELATED APPLICATIONS

This application is a continuation of U.S. patent application Ser. No. 16/201,621, filed Nov. 27, 2018, which is a continuation of U.S. patent application Ser. No. 15/996,427, filed Jun. 1, 2018, now U.S. Pat. No. 10,168,537, which claims the benefit of U.S. Provisional Application No. 62/644,353, filed Mar. 16, 2018, all of which are incorporated by reference in their entirety.

BACKGROUND

This disclosure relates generally to near-eye-displays, and in particular, to single-chip superluminous light emitting diode (SLED) arrays for waveguide displays.

In conventional display designs for near-eye-displays, some important factors considered are brightness, framerate, resolution, and compactness. Framerate and resolution for microelectromechanical systems (MEMS) micromirror based two dimensional (2D) scanning displays in conventional near-eye displays are generally limited by a resonant frequency of the MEMS micromirrors. For example, a raster-scanning MEMS micromirrors operating at 27 kilo Hertz (kHz) and scanning 1080 lines may be limited to a frame rate of 35 frames per second (fps). This frame rate is insufficient for modern augmented reality and virtual reality applications.

SUMMARY

A source assembly for providing light. The source assembly comprises a source element array, and a scanning mirror assembly. The source element array includes a super luminous diode (SLED) array of SLEDs that are configured to emit light. The SLED array is on a single chip. In some embodiments, each SLED in the SLED array emits light in the same color channel (e.g., green). In some embodiments, there are multiple SLED arrays that each are on respective chips and each are associated with a different color channel (e.g., one is red, one is blue, and one is green). The scanning mirror assembly is configured to scan light emitted from the SLED array (and/or multiple SLED arrays) to an entrance location of an output waveguide as scanned image light.

In some embodiments, the source assembly is part of a waveguide display. The waveguide display may be part of an artificial reality system. The waveguide display includes the source assembly and an output waveguide. The output waveguide includes an input area and an output area. The output waveguide is configured to receive the scanned image light emitted from the scanning mirror assembly at the input area. The output waveguide is configured to expand the received light in at least one dimension to form expanded image light. The output waveguide is configured to output the expanded image light from a portion of the output area.

Figure 1:
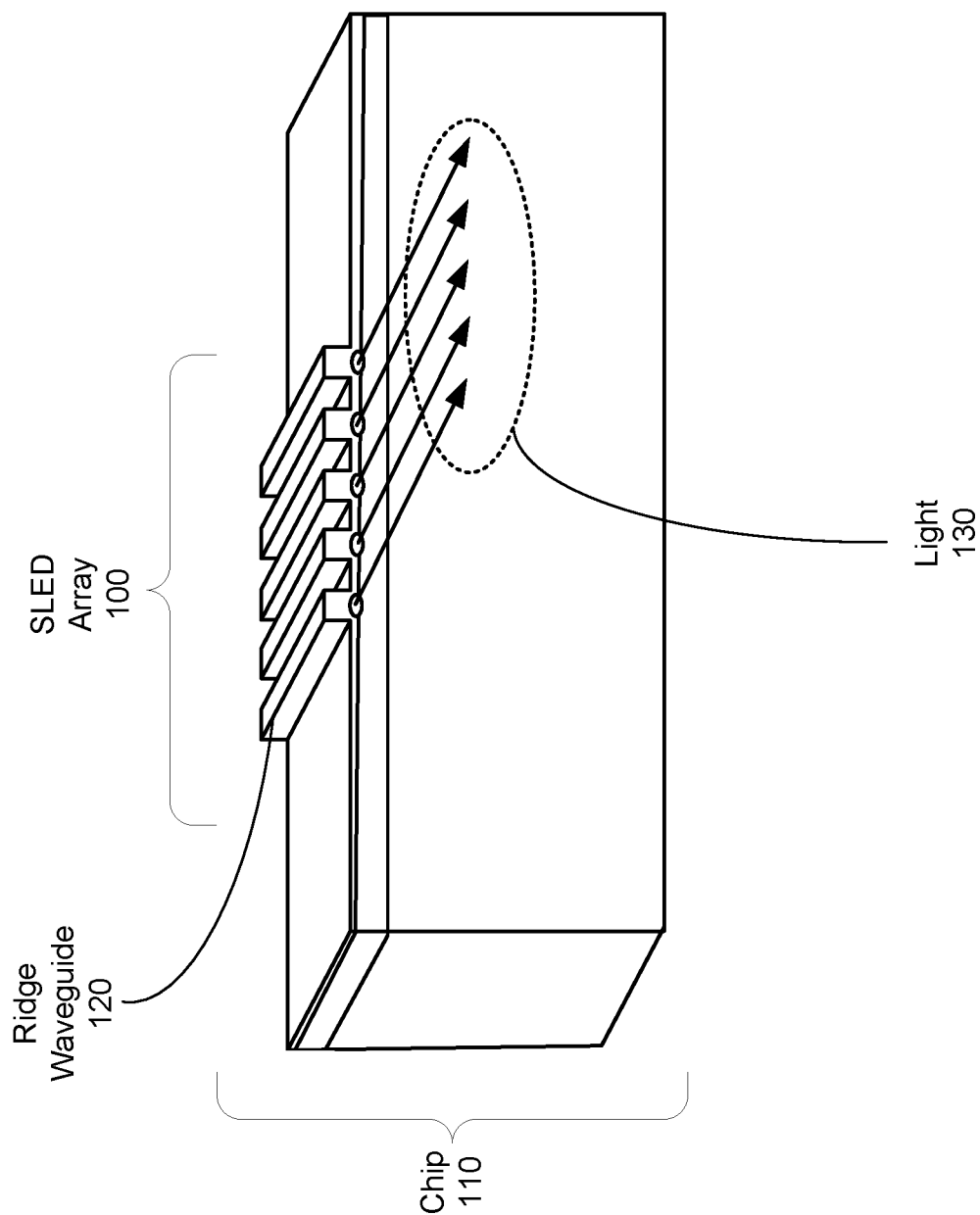
FIG. 1 is an isometric view of a SLED array, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein. Additional details are attached in the appendix.

Overview of the Disclosure

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

A source assembly provides light to, e.g., a waveguide display. The source assembly comprises a source element array and a scanning mirror assembly. The source element array includes a super luminous diode (SLED) array of SLEDs that are configured to emit light. The SLED array is on a single chip. In various embodiments, placing multiple SLEDs on a single chip (e.g., in an array) enables a decrease in distance between each SLED. Additionally, placing multiple SLEDs on a single chip may decrease a variance in the emitter distances of each SLED (e.g., lithographically defining emitter pitch with a tolerance of <1 micrometer). In some embodiments, each SLED in the SLED array emits light in a same color channel (e.g., green). Alternatively, a SLED array may include SLEDs of different color channels on the single chip.

A color channel is a specific optical band of wavelengths, and the optical band may be relatively narrow (e.g., 5 nm). A color channel may be an optical band of wavelengths that corresponds to some portion of a visible spectrum (e.g., red light, green light, yellow light, blue light, violet light, etc.), some portion of an infrared spectrum, or some other portion of the electromagnetic spectrum. Color channels in the visible spectrum are typically used to present content to a user. Color channels outside of the visible spectrum may be used, to, e.g., provide structured light patterns that can be used to track movement of the eyes of the user.

In some embodiments, there are multiple SLED arrays that each are on respective chips and each are associated with a different color channel (e.g., one is red, one is blue, and one is green). A light combining assembly may be used to combine the light from the different SLED arrays (on the different chips) into a single beam that is provided to the scanning mirror assembly.

The scanning mirror assembly is configured to scan light emitted from the SLED array (and/or multiple SLED arrays) to an entrance location of an output waveguide as scanned image light. The scanning mirror assembly may include one or more microelectromechanical systems (MEMS) mirrors to scan the light. Note that frame rate and resolution for MEMS mirrors are generally limited by a resonant frequency (of the MEMS mirror), and increasing the resonant frequency to accommodate high frame rates can be very difficult. A SLED array may be treated as a line source (i.e., multiple point sources arranged in 1 dimension). Accordingly, a larger portion of the image is scanned out (relative to a point source) for a given instant in time, thereby allowing an increase in effective frame rate (relative to conventional point source scanning systems) while bypassing problems associated with having to increase the resonant frequency of a MEMS mirror.

The output waveguide may be part of, e.g., a waveguide display. The waveguide display may be part of an artificial reality system. The waveguide display includes the source assembly, the output waveguide, and a controller. The output waveguide includes an input area at the target location, and an output area. The output waveguide receives the scanned image light at the input area, expands (e.g., via pupil replication) the scanned image light in at least one dimension, and outputs expanded image light from the output area. The controller controls the light source and the scanning mirror assembly. For example, the controller may instruct the light source to vary brightness of individual SLEDs as a function of time and/or scanning location to ensure the expanded image light has a uniform brightness value.

FIG. 1 is an isometric view of a SLED array 100, in accordance with one or more embodiments. The SLED array 100 is a solid-state device. The SLED array 100 includes a plurality of SLEDs that are on a single chip 110. A SLED is an edge emitting semiconductor light source that is based on superluminescence. Note that while FIG. 1 shows five SLEDS in the SLED array 100, in other embodiments, the number of SLEDs in the SLED array may be different.

Each SLED includes a ridge waveguide (e.g., ridge waveguide 120) that confines an optical mode of light emitted by an active region such that the confined optical mode propagates in a first dimension. The ridge waveguide structure is a circular or rectangular waveguide having one or more longitudinal internal ridges that provides a stronger optical confinement due to the presence of a material with a lower index of refraction than the ridges (e.g. air) surrounding three sides of the ridge waveguide. Unlike a laser diode, a SLED is designed to prevent light from cycling back and forth in the ridge waveguide. This keeps the light temporally incoherent. Accordingly, light 130 that is emitted from the SLED array 100 is spatially coherent (e.g., divergence angle less than 2 arcminutes as it couples to the output waveguide) and temporally incoherent (e.g., coherence length in the range of 20 to 200 microns for source emitting light in a visible band). Additional details regarding the emission characteristics of the light source may be found in, e.g., U.S. application Ser. No. 15/650,612, which is hereby incorporated by reference in its entirety.

The light 130 emitted by the SLED array 100 is typically a single color channel. However, in some embodiments, the SLED array 100 may include SLEDs that emit light in different color channels. For example a SLED array may include SLEDs that emit in different portions of the visible band (e.g., red, green, blue), emit in the visible band and in the IR band, etc.

In embodiments not shown, the SLED array 100 may have a fan-out device structure. A fan-out device structure can reduce pixel cross talk between each of the SLEDs in the SLED array 100 while maintaining a constant value of the pixel pitch. The fan-out device structure is a configuration that increases the separation between the SLEDS such that the image light from a first SLED is not coupled into the image light from and adjacent SLED. The fan-out device structure may be based on a separation of non-transmissive material, a separate waveguide/fiber for each SLED, or some combination thereof. Additional details of the fan-out structure are shown and described e.g., U.S. application Ser. No. 15/896,392, which is hereby incorporated by reference in its entirety.

Figure 2A:
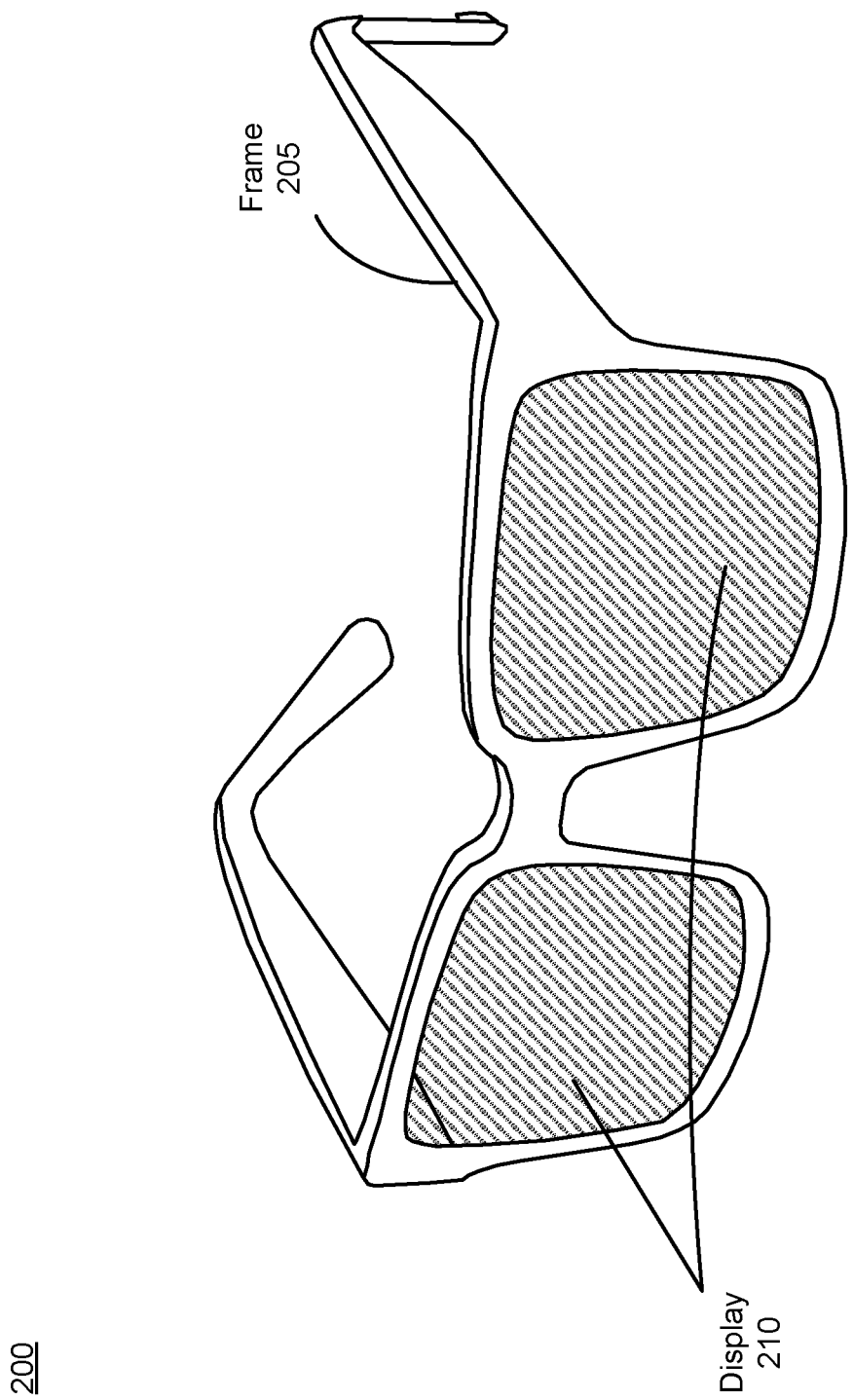
FIG. 2A is a diagram of a near-eye-display (NED), in accordance with one or more embodiments.

FIG. 2A is a diagram of a near-eye-display (NED) 200, in accordance with one or more embodiments. The NED 200 presents media to a user. Examples of media presented by the NED 200 include one or more images, video, audio, or some combination thereof. In some embodiments, audio is presented via an external device (e.g., speakers and/or headphones) that receives audio information from the NED 200, a console (not shown), or both, and presents audio data based on the audio information. The NED 200 is generally configured to operate in artificial reality systems. In some embodiments, the NED 200 may augment views of a physical, real-world environment with computer-generated elements (e.g., images, video, sound, etc.).

The NED 200 shown in FIG. 2A includes a frame 205 and a display 210. The frame 205 includes one or more optical elements which together display media to users. The display 210 is configured for users to see the content presented by the NED 200. As discussed below in conjunction with FIG. 3, the display 210 includes at least one source assembly to generate an image light to present media to an eye of the user. The source assembly includes, e.g., a source element array. The source element array includes at least one SLED array that is arranged on a single chip. In some embodiments, a NED may also be referred to as a Head-Mounted-Display (HMD).

Figure 2B:
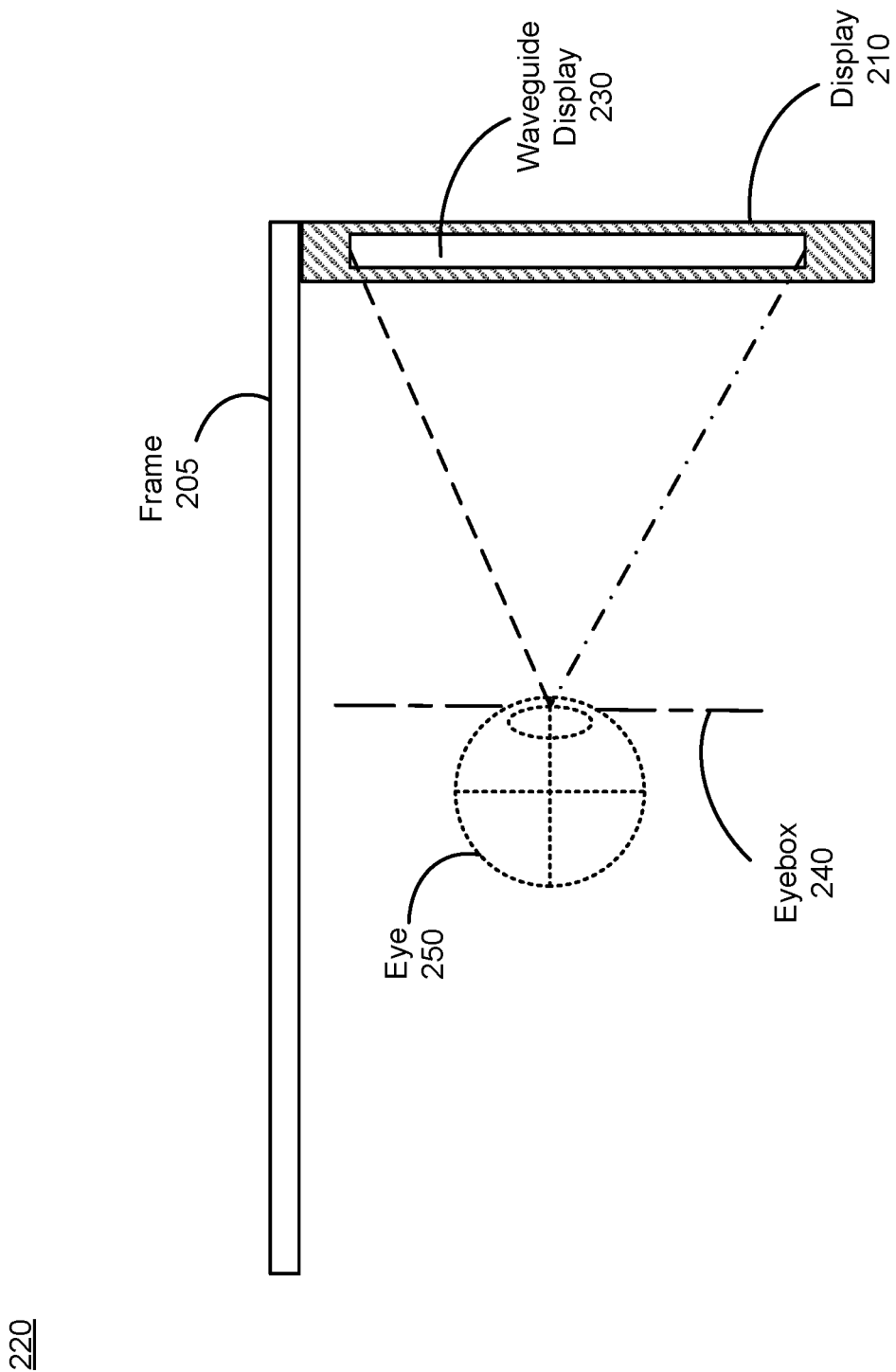
FIG. 2B is a cross-section of an eyewear of the NED illustrated in FIG. 2A, in accordance with one or more embodiments.

FIG. 2B is a cross section 220 of the NED 200 illustrated in FIG. 2A, in accordance with one or more embodiments. The cross section 220 includes at least one waveguide display 230, and an eyebox 240. The eyebox 240 is a location where the eye 250 is positioned when the user wears the NED 200. In some embodiments, the frame 205 may represent a frame of eyewear glasses. For purposes of illustration, FIG. 2B shows the cross section 220 associated with a single eye 250 and a single waveguide display 230, but in alternative embodiments not shown, another waveguide assembly which is separate from the waveguide display 230 shown in FIG. 2B, provides image light to another eye of the user.

The waveguide display 230, as illustrated below in FIG. 2B, is configured to direct the image light to the eye 250 through the eyebox 240. The waveguide display 230 may be composed of one or more materials (e.g., plastic, glass, etc.) with one or more refractive indices that effectively minimize the weight and widen a field of view (hereinafter abbreviated as 'FOV') of the NED 200. In alternate configurations, the NED 200 includes one or more optical elements between the waveguide display 230 and the eye 250. The optical elements may act to, e.g., correct aberrations in image light emitted from the waveguide display 230, magnify image light emitted from the waveguide display 230, some other optical adjustment of image light emitted from the waveguide display 230, or some combination thereof. The example for optical elements may include an aperture, a Fresnel lens, a convex lens, a concave lens, a filter, or any other suitable optical element that affects image light.

The waveguide display 230 includes a source assembly to generate an image light to present media to user's eyes. The source assembly includes at least one SLED array that is on a single chip. The source assembly is discussed in detail below with regard to FIGS. 3-6.

In some embodiments, the waveguide display 230 includes an eye tracker (not shown) that tracks a gaze location of the user's eye 250. The eye tracker determines eye tracking information for the user's eye 250. The eye tracking information may comprise information about a position and an orientation of the user's eye 250 in the eyebox 240. In some embodiments, a SLED array in the source assembly may emit an infrared structured light pattern that illuminates the eye 250. One or more cameras of the eye tracker capture images of the illuminated eye 250, and determine eye tracking information using one or more of the captured images. The waveguide display 230 may use the eye tracking information in, e.g., foveated rendering and/or mitigating vergence accommodation conflict.

Figure 3:
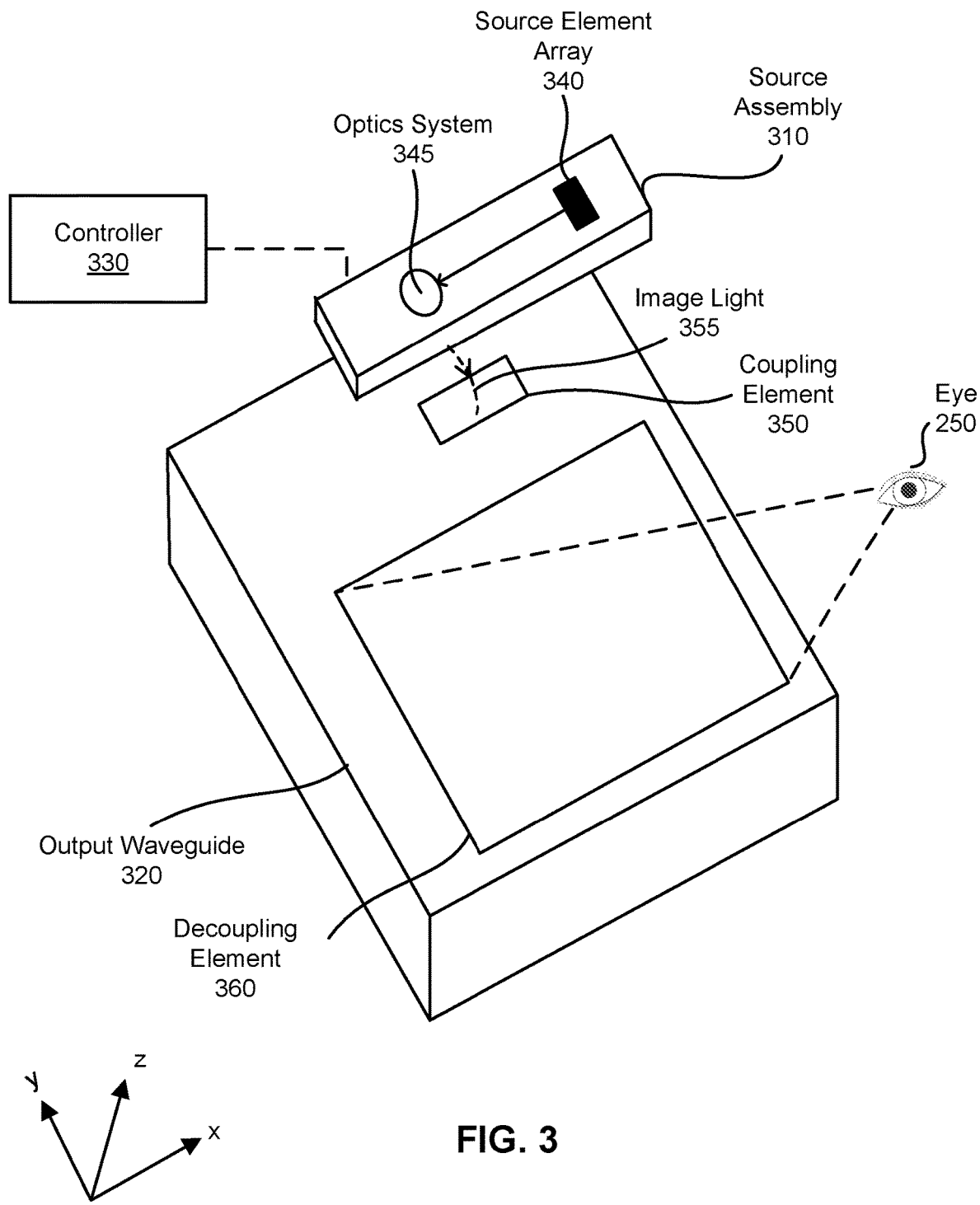
FIG. 3 illustrates an isometric view of a waveguide display, in accordance with one or more embodiments.

FIG. 3 illustrates an isometric view of a waveguide display 300, in accordance with one or more embodiments. In some embodiments, the waveguide display 230 is an embodiment of the waveguide display 300. The waveguide display 300 may be part of the NED 200, part of some other NED, or other system that directs display image light to a particular location.

The waveguide display 300 includes a source assembly 310, an output waveguide 320, and a controller 330. For purposes of illustration, FIG. 3 shows the waveguide display 300 associated with a single eye 250, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 includes a source element array 340 and an optics system 345 (e.g., as further described below with regard to FIG. 4). The source element array 340 is an optical component that generates image light using a plurality of SLEDs placed in one or more SLED arrays. Each SLED array (e.g., similar to what is shown in FIG. 1) in the source element array 340 is on a single respective chip (i.e., monolithic). The source element array 340 generates image light in one or more color channels (e.g., red, blue, green, infrared, etc.). The source element array 340 is further described with reference to FIG. 4 below.

The optics system 345 performs a set of optical processes, including, but not restricted to, focusing, combining, conditioning, and scanning processes on the image light generated by the source element array 340. In some embodiments (not illustrated), the optics system 345 includes a combining assembly, a light conditioning assembly, and a scanning mirror assembly, as described below in detail in conjunction with FIG. 4. The source assembly 310 generates and outputs an image light 355 to a coupling element 350 of the output waveguide 320.

The output waveguide 320 is an optical waveguide that outputs image light to an eye 250 of a user. The output waveguide 320 receives the image light 355 at one or more coupling elements 350, and guides the received input image light to one or more decoupling elements 360. In some embodiments, the coupling element 350 couples the image light 355 from the source assembly 310 into the output waveguide 320. The coupling element 350 may be, e.g., a diffraction grating, a holographic grating, some other element that couples the image light 355 into the output waveguide 320, or some combination thereof. For example, in embodiments where the coupling element 350 is diffraction grating, the pitch of the diffraction grating is chosen such that total internal reflection occurs, and the image light 355 propagates internally toward the decoupling element 360. For example, the pitch of the diffraction grating may be in the range of 300 nm to 600 nm.

The output waveguide 320 expands the light received from the optics system in one or more dimensions. In some embodiments, expanding the image light is caused by replication of a pupil of the source assembly 310 across one or more dimensions. In some other embodiments the replicated pupils may overlap each other. In various embodiments, the output waveguide 320 may expand light over one or more dimensions wherein the one or more dimensions are not orthogonal. In still other embodiments, the output waveguide 320 may expand the received light two or more orthogonal dimensions (e.g., x axis and y axis). The replicated pupils may fill some or all of an eyebox (e.g., eyebox 250). For example, the replicated pupils are 10 nm to 40 nm in diameter and allow for easier placement of an eye (e.g., an eye 250) in the eyebox.

The decoupling element 360 decouples expanded image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. For example, the pitch of the diffraction grating may be in the range of 300 nm to 600 nm. An orientation and position of the image light exiting from the output waveguide 320 is controlled by changing an orientation and position of the image light 355 entering the coupling element 350.

The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the scanning operations of the source assembly 310. The controller 330 determines scanning instructions for the source assembly 310 based at least on the one or more display instructions. Display instructions are instructions to render one or more images. In some embodiments, display instructions may simply be an image file (e.g., bitmap). The display instructions may be received from, e.g., a console of an artificial reality system (not shown here). Scanning instructions are instructions used by the source assembly 310 to generate image light 355. The scanning instructions may include, e.g., a color channel, a scanning rate, an orientation of a scanning mirror assembly, one or more illumination parameters (described below with reference to FIG. 4), or some combination thereof. The controller 330 includes a combination of hardware, software, and/or firmware not shown here so as not to obscure other aspects of the disclosure.

Note that a scan path can include banding caused by oscillations of the scanning mirror assembly associated with one or more SLED arrays. As discussed in detail with regard to FIG. 7 below, the controller may instruct the source element array 340 to vary brightness of individual SLEDs as a function of time and/or scanning location to ensure the expanded image light has a uniform brightness value.

Figure 4:
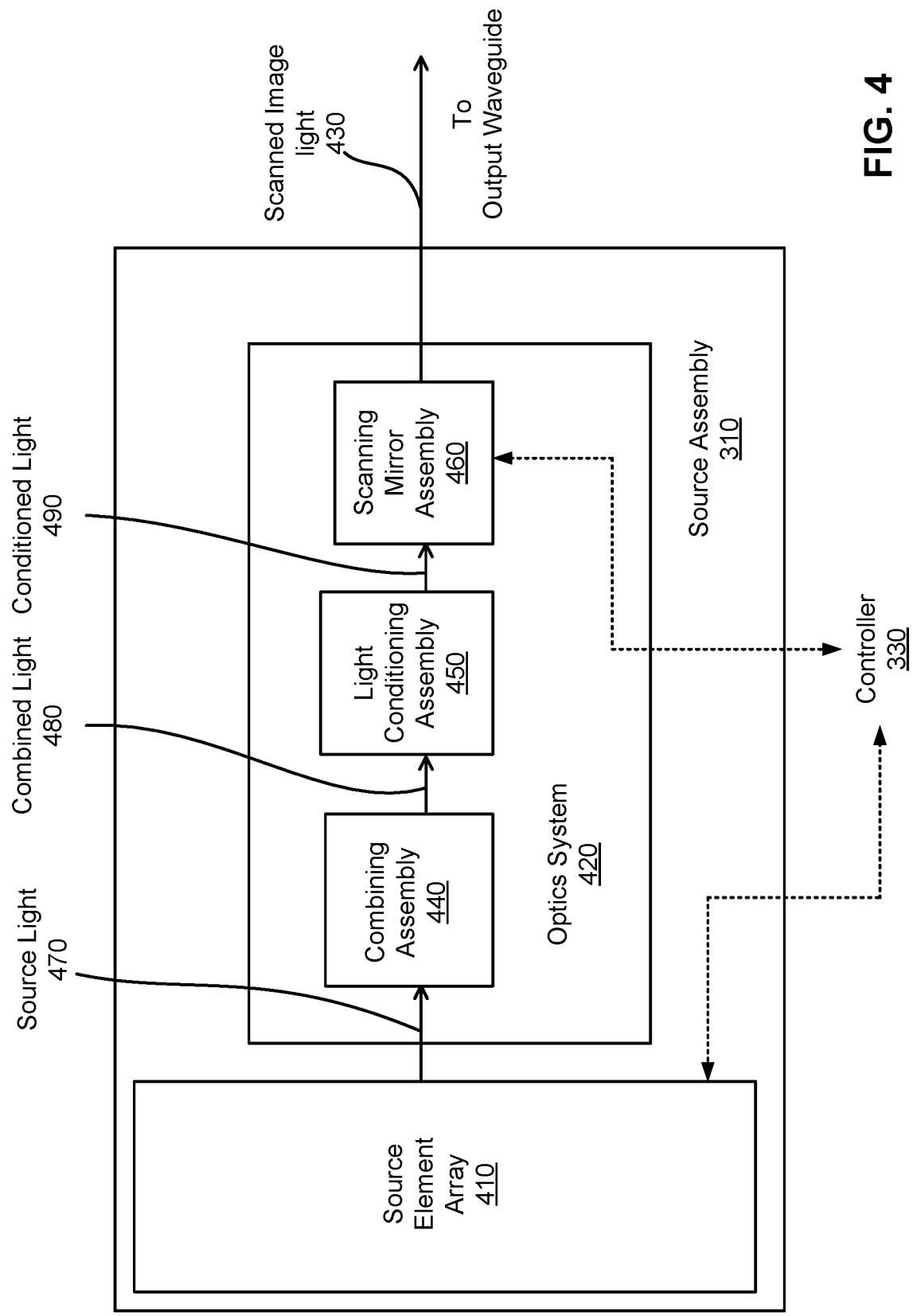
FIG. 4 illustrates a block diagram of a source assembly, in accordance with one or more embodiments.

FIG. 4 illustrates a block diagram of the source assembly 310, in accordance with one or more embodiments. The source assembly 310 includes a source element array 410 and an optics system 420. The source element array 340 is an embodiment of the source element array 410. The optics system 345 is an embodiment of the optics system 420.

The source assembly 310 generates light in accordance with scanning instructions from the controller 330. The source assembly 310 includes a source element array 410, and an optics system 420. The source element array 410 is a source of light that generates a spatially coherent or a partially spatially coherent image light, and temporally incoherent. The source element array 410 emits light in a visible band (e.g., from about 390 nm to 700 nm), and it may emit light that is continuous or pulsed. In some embodiments, the source element array 410 may be a superluminous LED (SLED) array of densely packed ridge waveguides with a wide emission spectrum. The source element array 410 emits light in accordance with one or more illumination parameters received from the controller 330. An illumination parameter is an instruction used by the source element array 410 to generate light. An illumination parameter may include, e.g., wavelength, pulse rate, pulse amplitude, beam type (continuous or pulsed), other parameter(s) that affect the emitted light, or some combination thereof.

The source element array 410 includes one or more SLED arrays that are each on different chips (e.g., SLED array 100). In some embodiments, each SLED array includes multiple SLEDs that are arranged in a one dimensional linear row. Each SLED of a SLED array emits light that is spatially coherent and temporally incoherent.

In some embodiments, each SLED array of the one or more SLED arrays generates light of a different color channel. For example, a first SLED array on a first chip generates light of a first color channel (e.g., red light), a second SLED array on a second chip generates light of a second color channel (e.g., green light), and a third SLED array on a third chip generates light of a third color channel (e.g., blue). In other embodiments, each SLED array of the one or more SLED arrays generates light of a same color channel. In some embodiments, one SLED array of the one or more SLED arrays emits light in a band used for eye tracking (e.g., infrared light).

In some embodiments, a SLED array of the one or more SLED arrays may include SLEDs that associated with different color channels. For example, the SLED array may include a SLED on a chip that emits light of a first color channel and also include a SLED on the same chip that emits light of a second color channel.

In some embodiments, the source element array 410 is a one-dimensional linear array of SLEDS, where each SLED corresponds to a respective row in an image ultimately displayed to the user. As discussed above with respect to FIG. 1, each SLED includes a ridge waveguide. In one embodiment, the source element array 410 includes a constant pitch between each of the ridge waveguides. In other embodiments, a SLED array may include different pitches between at least some of the ridge waveguides.

The optics system 420 includes one or more optical components that condition the light from the source element array 410. Conditioning light from the source element array 410 may include, e.g., expanding, collimating, adjusting orientation in accordance with instructions from the controller 330, some other adjustment of the light, or some combination thereof. The one or more optical components may include, e.g., lenses, mirrors, apertures, gratings, or some combination thereof. Light emitted from the optics system 420 (and also the source assembly 310) is referred to as scanned image light 430. The optics system 420 outputs the scanned image light 430 at a particular orientation (in accordance with the scanning instructions) toward the output waveguide 320.

In the embodiment illustrated in FIG. 4, the optics system 420 includes a combining assembly 440, a light conditioning assembly 450, and a scanning mirror assembly 460. The combining assembly 440 combines source light 470 outputted by the source element array 410 into combined light 480. Source light 470 may include light of one or more color channels from a plurality of SLED arrays. In this embodiment, the source light 470 is generated using different SLED arrays in different positions, the combining assembly 440 acts to combine the various beams of light that compose the source light 470 into a single beam of the combined light 480. An example, combining assembly 440 is discussed in detail below with regard to FIG. 6. Note that other structures may be used to accomplish the same function. The combining assembly 440 transmits the combined light 480 to the light conditioning assembly 450. In alternate embodiments, the optics system 420 does not include a combining assembly 440. For example, the source element array 410 may include a single SLED array, and the source light 470 and the combined light 480 are the same.

In some configurations, the source assembly 310 includes a color converter (not shown) coupled to the source element array 410 to provide a full-colored image light to the light conditioning assembly 450. A color converter is a device that converts a light of specific band of wavelengths to a different band of wavelengths (i.e., one color channel to another color channel). The color converter may include a doped fiber, a phosphor, nanophosphors, colloidal and epitaxial quantum dots. For example, the color converter may include a green converter that converts an image light of a particular range of wavelength (e.g. a blue-colored image light) into a green-colored image light.

The light conditioning assembly 450 conditions the combined light 480 and emits a conditioned light 490 to the scanning mirror assembly 460. The conditioned light 490 is a light conditioned for incidence on the scanning mirror assembly 460. The light conditioning assembly 450 includes one or more optical components that condition the light from the source element array 410. Conditioning light from the source element array 410 may include, e.g., expanding, collimating, correcting for one or more optical errors (e.g., field curvature, chromatic aberration, etc.), some other adjustment of the light, or some combination thereof. The light conditioning assembly 450 conditions the source light 470 and emits the conditioned light 490 to the scanning mirror assembly 460.

The scanning mirror assembly 460 includes one or more optical elements that redirect image light via one or more reflective portions of the scanning mirror assembly 460. Where the image light is redirected toward is based on specific orientations of the one or more reflective portions. The one or more optical elements include at least one scanning MEMS mirror. In some embodiments, the scanning mirror assembly 460 includes a single scanning MEMS mirror that is configured to scan in at least two dimensions. In other embodiments, the scanning mirror assembly 460 may include a plurality of scanning MEMS mirrors that each scan in orthogonal directions to each other. The scanning mirror assembly 460 may perform a raster scan (horizontally, or vertically), a biresonant scan, or some combination thereof. In some embodiments, the scanning mirror assembly 460 may perform a controlled vibration along the horizontal and/or vertical directions with a specific frequency of oscillation to scan along two dimensions and generate a two-dimensional projected line image of the media presented to user's eyes. The scanning mirror assembly 460 emits the scanned image light 430 based on the conditioned light 490. The image light 335 is an embodiment of the scanned image light 430. In some embodiments, the scanned image light 430 couples to an output waveguide (e.g., the output waveguide 320) as described above with reference to FIG. 3.

In one example, the source assembly 310 performs a temporal modulation of the source light 470 to emit a temporally modulated image light, and the scanning mirror assembly 460 performs a scanning of the temporally modulated image light in accordance with a target frame rate of the scanned image light 430. The temporal modulation is such that each light source of the source assembly 310, in synchronization with the scanning mirror assembly 460, repeats a projection of the scanned image light 430, and thus, effectively increasing the refresh rate of the scanned image light 430 by the number of SLEDs in each color channel of the source assembly 310.

The scanning mirror assembly 460 performs an array translation of pixel positions to achieve a desired frame rate in accordance with the source light 470 outputted by the source element array 410. For example, the scanning mirror assembly 460 moves by one pixel position from a first instance of time to a second instance of time based on the desired level of brightness from the given number of pixel positions of the source element array 410. In another example, the scanning mirror assembly 460 performs an overlaying of red-green-blue (RGB) pixels with a time delay shorter than the response time of a human eye to direct a full colored image light. In some configurations, the scanning mirror assembly 460 includes at least one two-dimensional MEMS mirror that performs a scanning of the conditioned light 490 with a reduced frequency. In typical scanning mirror assemblies which do not perform the array translation, the frequency required could be as high as 50 kHz to 100 kHz. In contrast, the scanning mirror assembly 460 performs the scanning with a frequency based on a number of SLEDS in the source element array 410. For example, when the source element array 410 includes three SLED arrays emitting a red image light, the frequency of the scanning mirror assembly 460 is less than 20 kHz. In another example, the scanning mirror assembly 460 includes a two-dimensional MEMS mirror performing a scanning with frequency of 20 kHz. By scanning multiple sources at the same time, the source assembly 310 is able to have a frame rate that greatly exceeds that of conventional single source scanning systems. For example, conventional systems typically would have a frame rate of ~35 frames per second (fps), whereas the source assembly 310 can have a frame rate of 70 fps or more (e.g., 200 fps).

The controller 330 controls the source element array 410 and the scanning mirror assembly 460. The controller 330 takes content for display, and divides the content into discrete sections. The controller 330 instructs the source element array 410 to sequentially present the discrete sections using individual SLEDs (or SLED arrays) corresponding to a respective row in an image ultimately displayed to the user. The controller 330 instructs the scanning mirror assembly 460 to scan the presented discrete sections to different areas of a coupling element of the output waveguide 320. Accordingly, at the eyebox of the output waveguide 320, each discrete portion is presented in a different location. While each discrete section is presented at different times, the presentation and scanning of the discrete sections occurs fast enough such that a user's eye integrates the different sections into a single image or series of images. The controller 330 may also provide scanning instructions to the source element array 410 that include an address corresponding to an individual SLED of the source element array 410 and/or an electrical bias applied to the individual SLED.

The scanned image light 430 can include banding caused in part by oscillations of the optical elements that redirect light in the scanning mirror assembly 460. As discussed in detail with regard to FIG. 7 below, the controller 330 may instruct the source element array 410 to vary brightness of individual SLEDs as a function of time and/or scanning location to ensure the scanned image light 430 has a uniform brightness value.

Figure 5:
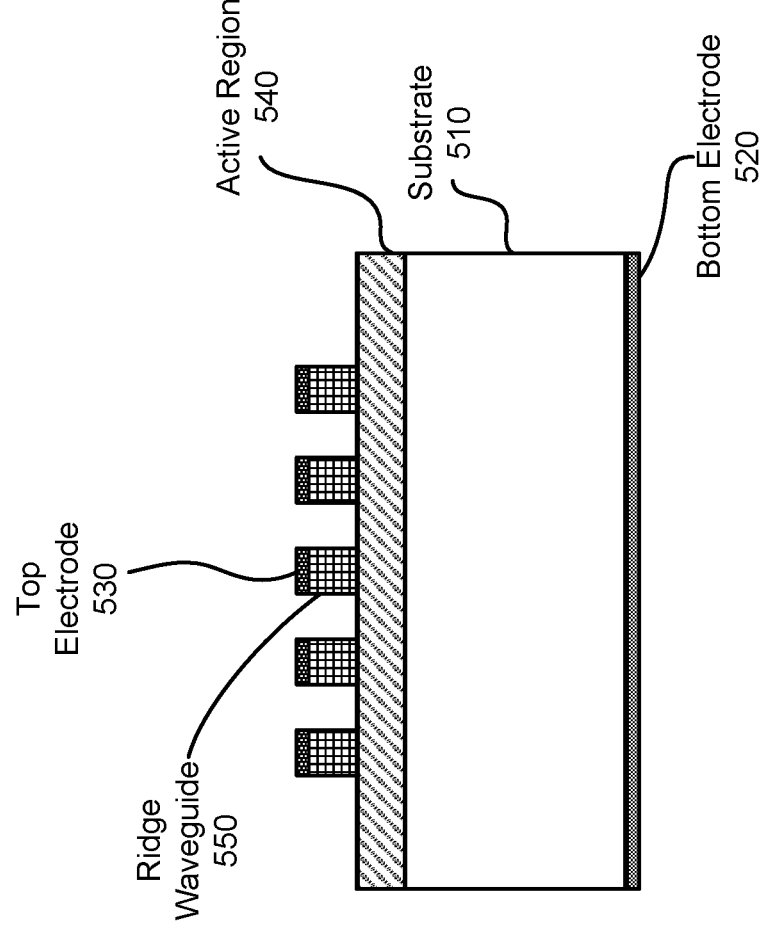
FIG. 5 illustrates a profile view of a SLED array, in accordance with one or more embodiments.

FIG. 5 illustrates a profile view of a SLED array 500, in accordance with one or more embodiments. In the illustrated examples, the SLED array 500 comprises five ridge waveguides arranged horizontally on a semiconductor substrate 510 comprising a single chip. The SLED array 500 of FIG. 5 is an embodiment of the SLED array 100 depicted above in conjunction with FIG. 1. In FIG. 5, tops of each of the ridge waveguides are coupled to a top electrode 530 while a bottom of each of the ridge waveguides is coupled to the substrate 510. As illustrated in FIG. 5, the substrate 510 is coupled to a common bottom electrode 520. Both the top electrode 530 and the bottom electrode 520 are electrically coupled to a controller via, for example, one or more wire bonds.

In various embodiments, a controller (e.g., the controller 330) is configured to individually address each of the five ridge waveguides associated with SLED array 500. For example, the application of a current to a top electrode 530 results in the formation of an electric field between the top electrode 530 and the bottom electrode 520. In the previous example, the formation of an electric field results in the generation of a current flow in an active region 540 thereby modulating a brightness light emitted by a ridge waveguide 550 coupled to the top electrode 530. In various embodiments, the magnitude of the current applied is related to change in brightness of a ridge waveguide. Note that while 5 ridge waveguides are illustrated in FIG. 5, in other embodiments the SLED array 500 may include some other number (more or less) of ridge waveguides.

Figure 6:
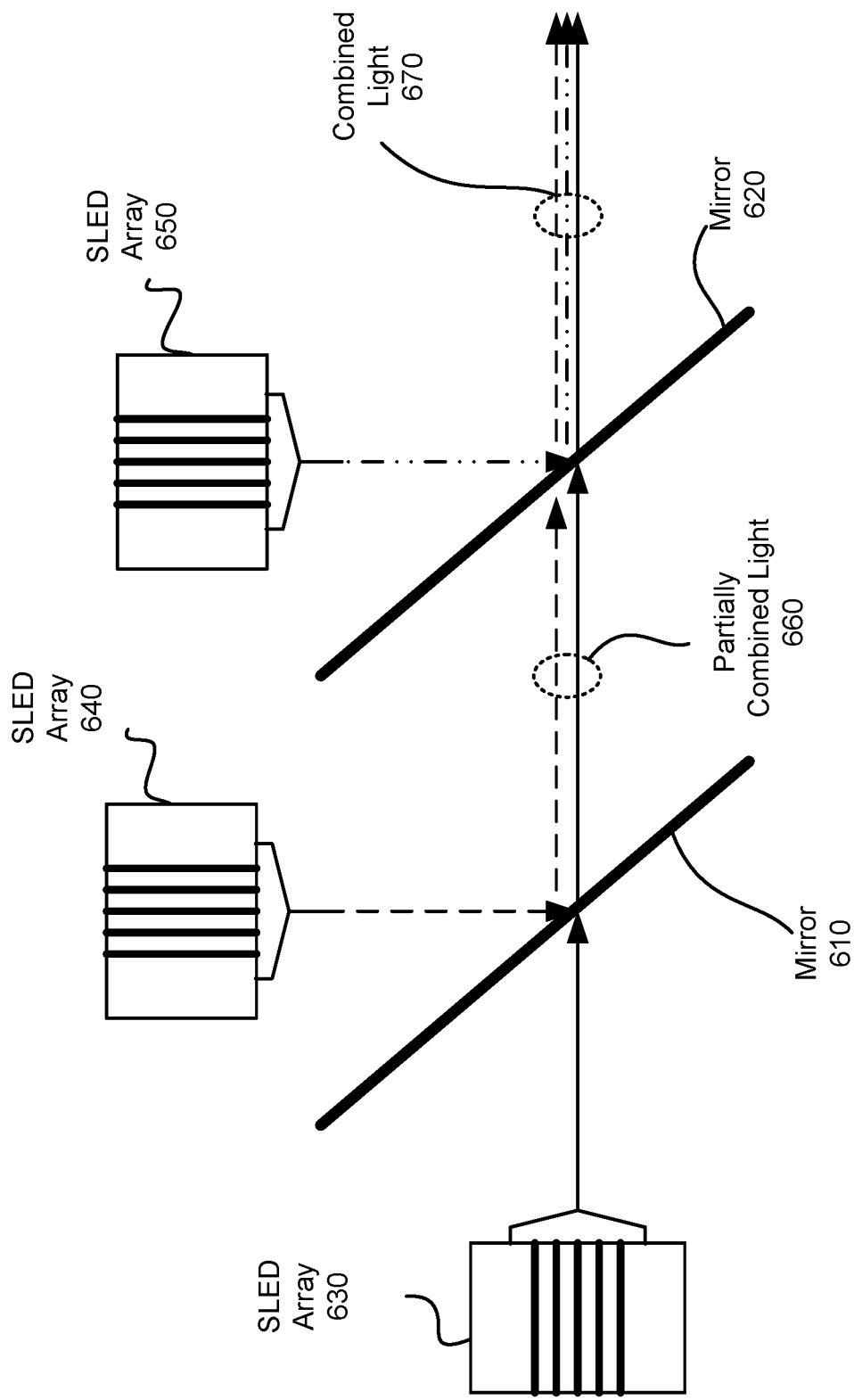
FIG. 6 illustrates a combining assembly, in accordance with one or more embodiments.

FIG. 6 illustrates a combining assembly 600, in accordance with one or more embodiments. The combining assembly 600 is an embodiment of the combining assembly 450 of FIG. 4. The combining assembly 600 includes a mirror 610 and a mirror 620. The mirror 610 and the mirror 620 are dichroic mirrors. Each of the mirror 610 and the mirror 620 have a respective transmission passband and respective reflection passband. A transmission passband is a band of wavelengths within which the mirror 610 and the mirror 620 transmits an incident light. A reflection passband is a band of wavelengths within which the mirror 610 and the mirror 620 reflects an incident light. The mirror 610 has a transmission passband that includes light emitted by a SLED array 630, and has a reflection passband that includes light emitted from a SLED array 640. In contrast, the mirror 620 has a transmission passband that includes light emitted by the SLED array 630 and the SLED array 640, and has a reflection passband that includes light emitted from the SLED array 650. Light from the SLED array 630 is transmitted by the mirror 610. Light from the SLED array 640 is reflected by the mirror 610 such that it creates a partially combined light 660. The partially combined light 660 is transmitted by the mirror 620. And light from the SLED array 650 is reflected by the mirror 620 such that it combines with the partially combined light 660 to form the combined light 670. While FIG. 6 illustrates an example including two mirrors and three different SLED arrays, in other embodiments, more and/or less mirrors and/or SLED arrays may be combined in similar manner to form the combined light 670.

Figure 7:
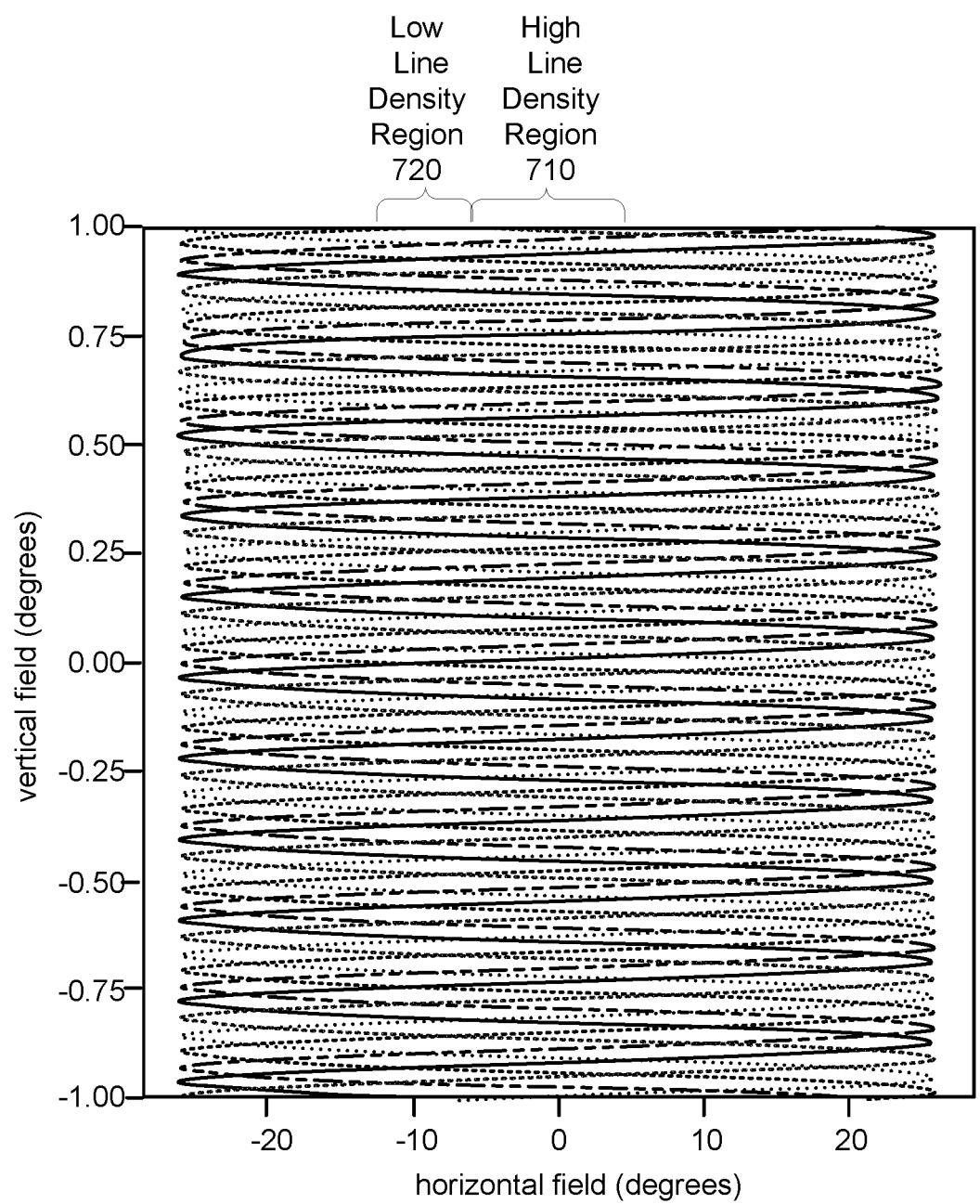
FIG. 7 illustrates a sample scan path for a single color, in accordance one or more embodiments.

FIG. 7 illustrates a portion of a sample scan path 700 for a single SLED array (e.g., SLED array 100), in accordance with one or more embodiments. Each of the dashed lines represent light from different SLEDs that are part of the SLED array. The scan path includes banding caused by oscillations of a scanning mirror assembly associated with the SLED array. For example, a line density and scanner velocity of a scanning mirror assembly change as a function of a horizontal field angle. As the lines traced by each SLED are scanned out, the lines can cross resulting in a plurality of high line density regions (e.g., region 710) and a plurality of low line density regions (e.g., region 720). A low line density region includes a minimum line density, and a high line density region includes a maximum line density. In various embodiments, a minimum line density is typically half a maximum line density. For example, a region of high line density may have a line density of 20 to 80 lines per degree. This lack of uniformity in line density can appear as banding (i.e., low density line regions appear to have a different brightness than high density line regions) in the image light.

In an embodiment, a controller (e.g., the controller 330) adjusts control signals (e.g., current or voltage) applied to each SLED associated with the SLED array to mitigate banding in light output from the scanning mirror assembly. To even out a perceived brightness, the controller can adjust brightness of light emitted by one or more SLEDs. The controller may, e.g., increase brightness of one or more of the SLEDs in the low density line regions (e.g., the low line density region 720), decrease brightness of one or more of the SLEDs in the high density line regions (e.g., the high line density region 710), or some combination thereof, such that a relative brightness between the low line density regions and the high line density regions is the same (or within a threshold value of each other).

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A solid-state device configured to emit light in a visible band, and the emitted light has a coherence length in the range of 20 to 200 microns and has a divergence angle that is less than 2 arcminutes.

2. The solid-state device of 1, wherein the solid-state device is a superluminous light emitting diode (SLED) array of SLEDs that are arranged on a single chip.

3. The solid-state device of 2, wherein the SLED array is configured to emit light in a first optical band, and the light emitted from the SLED array and light emitted by a second light source are combined to form combined light.

4. The solid-state device of 3, wherein the light emitted from the second light source is in a second optical band that is different than the first optical band.

5. The solid-state device of 3, wherein the light emitted from the second light source is in the first optical band, and a color converter is configured to convert the light from the second source to a second optical band that is different than the first optical band, and the combined light includes light from the second source that has been converted to the second optical band.

6. The solid-state device of 3, wherein the second light source is a second SLED array.

7. The solid-state device of 6, wherein the SLED array is on the same chip as the second SLED array.

8. The solid-state device of 6, wherein the SLED array is on a different chip than the second SLED array.

9. The solid-state device of 2, wherein the SLEDs in the SLED array are arranged in a one-dimensional linear array.

10. The solid-state device of 2, wherein a pitch between adjacent SLEDs in the SLED array is at least 30 microns.

11. The solid-state device of 2, wherein a controller is configured to adjust control signals applied to SLEDs in the SLED array and control signals applied to the second light source to mitigate banding caused by scanning of the combined light.

12. The solid-state device of 1, wherein the solid-state device is part of a waveguide display.

13. A waveguide display comprising:
a solid-state device configured to emit light in a visible band, and the emitted light has a coherence length in the range of 20 to 200 microns and has a divergence angle that is less than 2 arcminutes;
a second light source configured to emit light, wherein the light emitted from the solid-state device and light emitted by the second light source are combined to form combined light; and
an output waveguide configured to direct image light to an eyebox of the waveguide display, wherein the image light is formed using at least some of the combined light.

14. The waveguide display of claim 13, wherein the solid-state device is a superluminous light emitting diode (SLED) array of SLEDs that are arranged on a single chip, and the SLED array is configured to emit light in a first optical band.

15. The waveguide display of claim 14, wherein the second light source is a second SLED array.

16. The waveguide display of claim 15, wherein the SLED array is on the same chip as the second SLED array.

17. The waveguide display of claim 15, wherein the SLED array is on a different chip than the second SLED array.

18. The waveguide display of claim 14, wherein a controller is configured to adjust control signals applied to SLEDs in the SLED array and control signals applied to the second light source to mitigate banding caused by scanning of the combined light.

19. The waveguide display of claim 14, wherein the light emitted from the second light source is in a second optical band that is different than the first optical band.

20. The waveguide display of claim 14, wherein the light emitted from the second light source is in the first optical band, the waveguide display further comprising:
a color converter configured to convert the light from the second source to a second optical band that is different than the first optical band, and wherein the combined light includes light from the second source that has been converted to the second optical band.

* * * * *